Nov. 21, 1972    E. C. POLING ETAL    3,703,428
APPARATUS FOR RESETTING THE CORNER OF
DEEP-DRAWN LAMINATED ARTICLES
Original Filed May 2, 1968    4 Sheets-Sheet 1

EZRA C. POLING
CHARLES E. BOTSFORD
INVENTORS

BY
ATTORNEYS

Nov. 21, 1972  E. C. POLING ETAL  3,703,428
APPARATUS FOR RESETTING THE CORNER OF
DEEP-DRAWN LAMINATED ARTICLES
Original Filed May 2, 1968  4 Sheets-Sheet 2

EZRA C. POLING
CHARLES E. BOTSFORD
INVENTORS

BY

ATTORNEYS

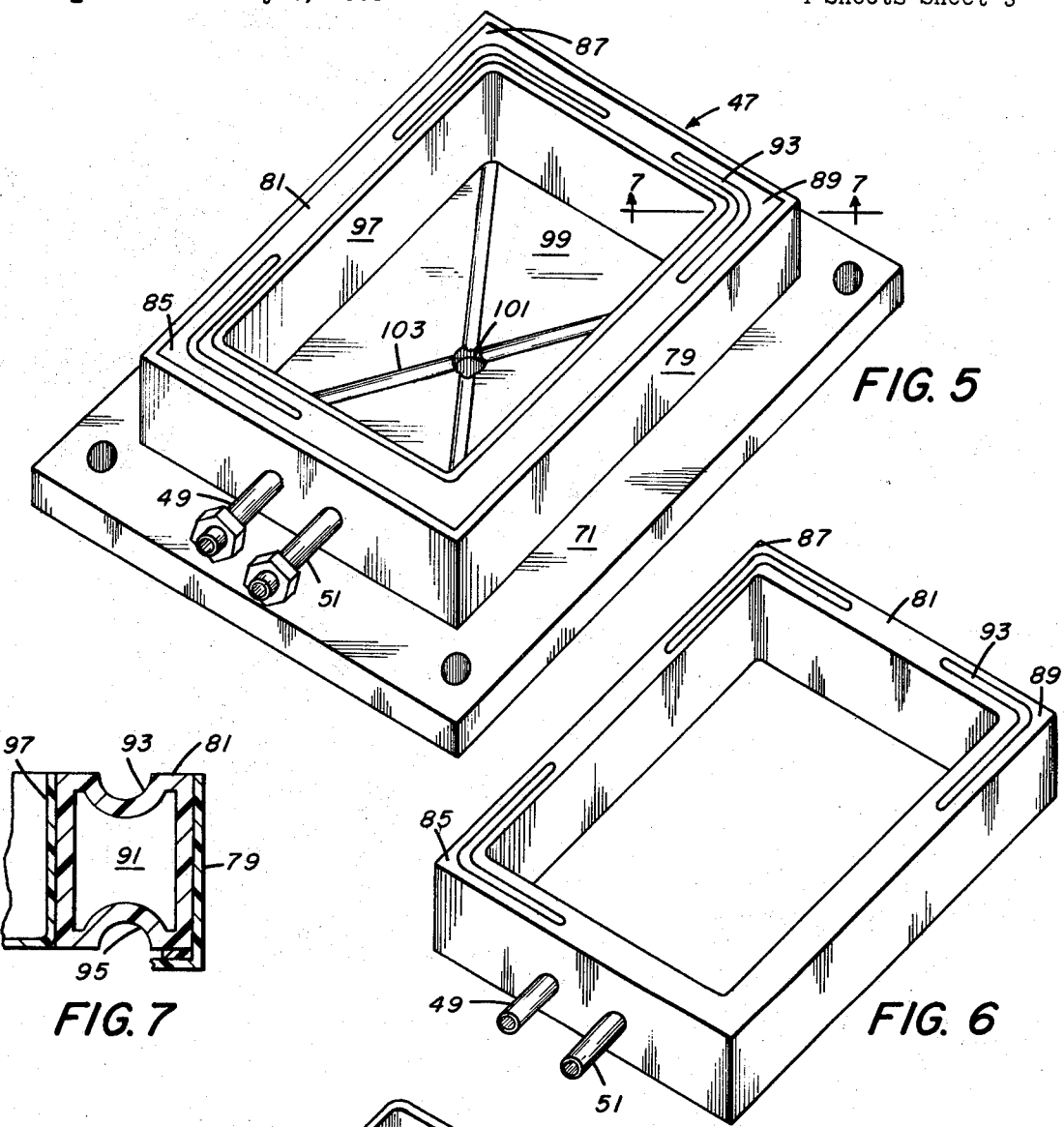
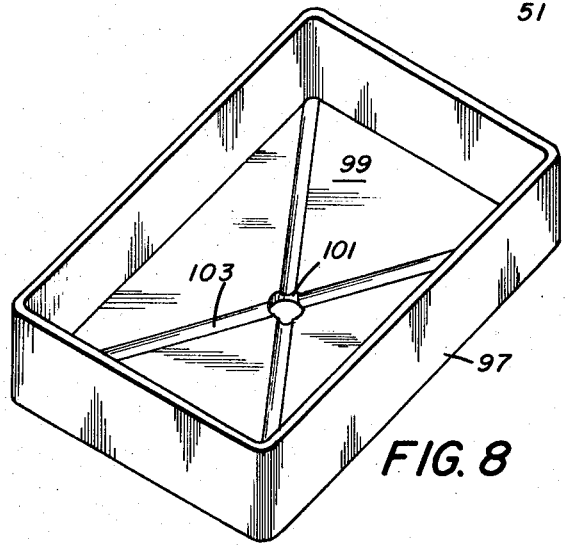
FIG. 5
FIG. 7
FIG. 6
FIG. 8
EZRA C. POLING
CHARLES E. BOTSFORD
INVENTORS
BY
ATTORNEYS

EZRA C. POLING
CHARLES E. BOTSFORD
INVENTORS

ATTORNEYS

United States Patent Office

3,703,428
Patented Nov. 21, 1972

3,703,428
APPARATUS FOR RESETTING THE CORNER OF DEEP-DRAWN LAMINATED ARTICLES
Ezra C. Polling, Webster, and Charles E. Botsford, Rochester, N.Y., assignors to Eastman Kodak Company, Rochester, N.Y.
Original application May 2, 1968, Ser. No. 726,114. Divided and this application Oct. 2, 1970, Ser. No. 77,732
Int. Cl. B32b 35/00
U.S. Cl. 156—382
1 Claim

ABSTRACT OF THE DISCLOSURE

A sheet of metal having a skin of plastic bonded thereto is deep drawn to form a box having an external plastic skin. Then laminating bonds are reset where delamination has occurred, usually at the corners, by heating locally from the inside of the box while concurrently applying pressure to the skin.

Apparatus for performing this method comprises a core having induction heating coils at the corners, over which the box fits, and a concave boot which fits over the box and has a fluid pressure actuated bladder to press against the corners of the box during the heating step.

An automatic control system provides for repetitive operation in a production line wherein a series of boxes are connected by a web and treated one after the other.

This is a division of U.S. application Ser. No. 726,114, filed May 2, 1968 now abandoned.

BACKGROUND OF THE INVENTION

Field of the invention

The present invention relates to a novel method of and apparatus for treating an article fabricated from a laminated sheet of a metal such as steel carrying a skin of a flexible thermoplastic material bonded thereto. More particularly, the invention is concerned with rebonding the thermoplastic skin to the underlying metal of the article over a delaminated area resulting from fabrication, as by a deep drawing operation for forming box shaped camera backs.

DESCRIPTION OF THE PRIOR ART

The deep drawing of laminated articles from a flat sheet comprising a metal carrying a skin of a flexible thermoplastic material is described in U.S. Patent 3,028,-667, which was granted Apr. 10, 1962. That patent also describes the problem of delamination of the flexible skin from the metal during the deep drawing operation, and describes a solution of that problem involving heat treating the article at a temperature between 200° F. and 350° F. to cause relamination. The disclosure is incorporated by reference herein.

We have found that when plastic-laminated metal articles such as camera backs are deep drawn, the delamination tends to occur locally at the corners of the article, and simple heat treatment of the article does not fully restore the lamination to the desired condition.

SUMMARY OF THE INVENTION

The principles of the invention will be described by way of illustration as applied to the relamination of delaminated corners on a deep drawn box. However, it is to be understood that the same principles apply to delaminated areas wherever they may occur.

In accordance with our invention, an article having at least one corner is deep drawn from a laminated sheet of metal having a skin of a flexible thermoplastic material bonded thereto, and then the delaminated areas, which are usually at a corner or corners of the article, are heated locally while the rest of the article is essentially unheated. Concurrently with the heating, mechanical pressure is applied to the plastic skin at the delaminated area, usually a corner or corners, so as to force the skin against the adjoining heated metal and cause it to adhere tightly thereto. During the heating and pressing operation cooling or heating fluid can be passed in indirect heat exchange relation with the plastic skin so as to prevent its overheating if it is a heat-sensitive plastic such as a vinyl chloride/vinyl acetate copolymer; or to heat it to flexibility if it is a heat-resistant plastic such as Teflon polytetrafluoroethylene.

The method described above can be performed manually by placing the deep-drawn article over a core having heating means positioned in correspondence with the corner or other areas to be heated, applying a concave boot over the article while introducing a pressure fluid to the interior of the boot so as to move localized parts of the boot into engagement with the delaminated area, and thereafter removing the article from between the core and boot.

More advantageously, however, the method is performed in a production line wherein a series of articles to be treated are moved automatically from the deep-drawing station through the relamination station, and then to a finishing station. As each article is indexed into position in the relamination station, relative movement is effected of the boot over the article and the article over the core into operative position, and then after the necessary dwell for relamination, away from one another out of operative position. Instead of only treating one article at a time, it is possible to treat two or more articles simultaneously by providing the appropriate number of cores and boots.

BRIEF DESCRIPTION OF THE DRAWINGS

The principles of the method and apparatus of our invention will be described more in detail hereinafter with reference to the accompanying drawings wherein:

FIG. 5 is an inverted perspective view showing the construction of the boot and its associated crosshead as viewed from the bottom of FIG. 4;

FIG. 6 is a perspective view of a bladder portion of the boot of FIG. 5;

FIG. 7 is a cross-sectional view taken along the line 7—7 in FIG. 5;

FIG. 8 is a perspective view of a heat-resistant elastomeric liner comprising a portion of the boot of FIG. 5;

DESCRIPTION OF THE PREFERRED EMBODIMENT

Figure 1:
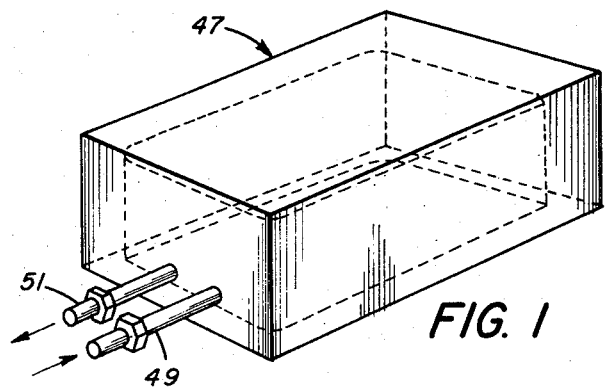
FIGS. 1, 2 and 3 are perspective views of a boot, a deep-drawn article to be relaminated, and a core, respectively, in vertical alignment for performing the invention.
Figure 2:
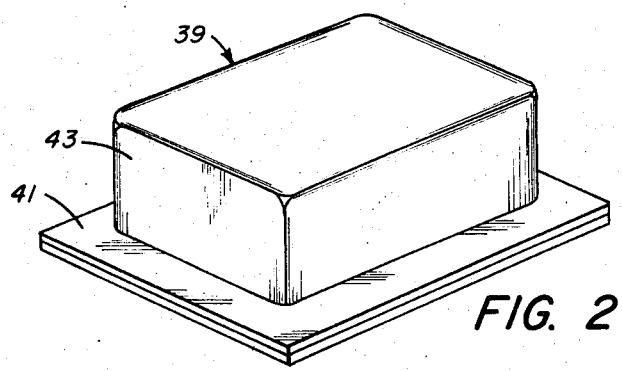
Figure 3:
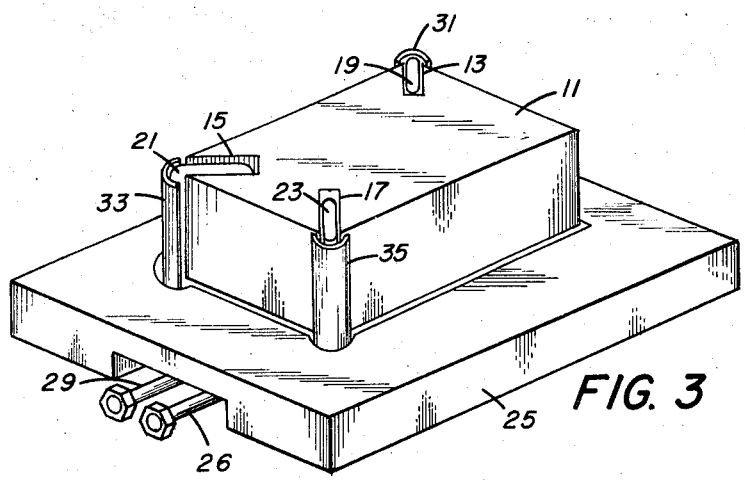

Referring to FIGS. 1, 2 and 3, there is shown a core 11 which is formed of a heat-resistant dielectric material such as cast nylon having three of the corners recessed at 13, 15 and 17 to receive upstanding tubular water cooled induction heating coils 19, 21 and 23 which extend upwardly through holes in a carrier plate 25 of non-metallic heat resistant asbestos-loaded material having suitable electrical and cooling water connections 26 and 29. Each of the coils is partially surrounded externally by a partially cylindrical insulating element 31, 33 and 35 made of longitudinally slit Teflon tubing which is secured in a hole in the plate 25, and provides proper spacing of the core from the article to be treated.

The deep-drawn plastic-laminated article 39 is a box which has a rim or flange 41, and a dished portion 43 which fits down over the core 11 so that three of its corners can be heat treated by the induction coils. In the particular article shown, the subsequent finishing and trimming steps will remove the fourth corner from the article so that it is unnecessary to heat treat it. However, in the event that all four corners will be retained, then a fourth induction coil is readily provided like the others.

The boot 47 fits snugly over the top of the article 39, with the internal corners of the boot adjoining the corners of the article. When the core, the article and the boot are all nested together, electric current is then supplied to the connections 26 and 29, while at the same time a pressure fluid flowing into the boot through a connection 49 and out through a connection 51 is employed to expand the resilient internal part of the boot into engagement with the appropriate corners of the article so as to press the plastic skin against the metal while the metal is heated.

Generally the fluid, such as water, is continuously flowing in through the connection 49 and out through the connection 51, and pressure is induced by actuating a valve (not shown) in the line 51 to a partially or fully closed position, thus providing the necessary expansion pressure. Partial closing permits maintaining the cooling flow of fluid so as to prevent overheating of the plastic skin; or alternatively, permits maintaining the flow of the heating liquid if heating of the skin is necessary. The internal construction of the boot 47 will be described more in retail hereinafter.

Figure 4:
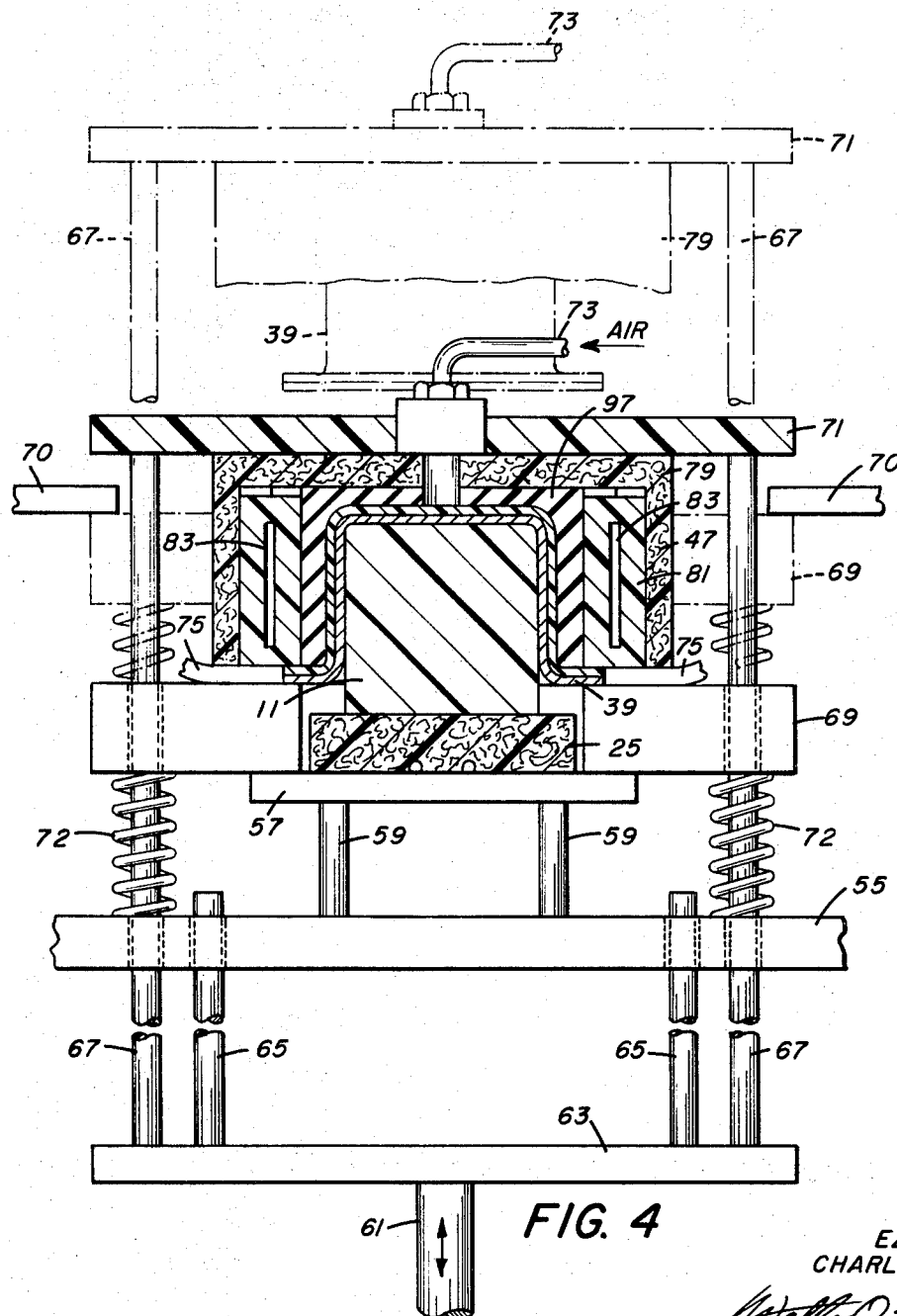
FIG. 4 is a vertical sectional view, parts being in elevation, showing an arrangement of apparatus adapted to be actuated mechanically for performing the novel method.

The apparatus as described above can be operated manually by an individual who brings the necessary parts together, then switches on the electric current, adjusts the pressure fluid, and after the necessary period of time, shuts off the current, releases the pressure, and separates the parts from one another. However, in a mass production operation such as the manufacture of camera backs, the apparatus is advantageously incorporated into an automatically operable system for repetitively carrying out the operation at a rapid rate. Such an apparatus is shown in FIG. 4 wherein a horizontal frame member 55 of the machine carries the base plate 25 on a table 57 which, in turn, is supported by a plurality of legs 59. A piston 61, operating within a hydraulic cylinder (not shown), is adapted to move a cross head 63 up and down below the frame member 55 so as to cause a plurality of legs 65 and a second group of legs 67 to move up and down through bores in the frame member.

Legs 65 at their upper ends are spaced below a stripper plate 69 of heat resistant nonmetallic asbestos-filled material, when the apparatus is down in heat treating position as shown. Legs 67 project upwardly through, and slide within, bores in the stripper plate 69 and are connected at their upper ends to an upper crosshead 71 which moves up and down with the crosshead 63. Springs 72 and 72 surrounding legs 67 are compressed when plate 69 moves down, and then act to move it upwardly as crosshead 71 moves up.

The boot 47 is secured to the upper crosshead 71 so that movement of piston 61 upwardly removes the boot from around the article 39. When the crosshead 63 has moved upwardly part way, the tops of legs 65 come into contact with the stripper plate 69 and move it upwardly to strip the article 39 off of core 11. After movement of the boot 47 far enough to clear the top of core 11, a pneumatic fluid such as air under pressure is introduced through a conduit 73 to the inside of the boot so as to expel the treated article therefrom. Web 75 at the same time pulls down on the article and aids in removing it from the boot. Then the article is removed from the apparatus, a new article is positioned over the core 11, the piston 61 moves downwardly to carry the article along with the boot 47 over the core 11, at which point the stripper plate 69 is carried downwardly. When the article 39 is one member of a continuous strip of similar articles, the connecting web 75 simply bends to permit the appropriate movement.

A stop 70 abuts against plate plate 69 when the latter is flush with the top of core 11, thus assuring a smooth path for the transport of a web of articles 39 through the machine, as described later in connection with FIG. 9. Stop 70 projects from the track 115, there described.

Now referring to FIGS. 5 to 8, the construction of the boot 47 will be described in detail. This boot comprises an external box 79 of heat resistant non-metallic asbestos-filled material which is secured to the upper crosshead 71 and is provided on the inside with a rectangular expansible and contractible pressure inducing frame member 81 which desirably is made of polyurethane or similar elastomeric material and has an internal gallery 83 extending around the internal periphery thereof from inlet 49 to outlet 51. This gallery at the three corners 85, 87 and 89 of the member is of greatly enlarged size, as shown at 91 in FIG. 7. At these corners the top and bottom surface of the member is slightly indented as shown at 93 and 95 in FIG. 6 so as to provide for an accordion or bellows expansion effect when the pressure within the gallery is increased, thus permitting the internal face of the member to move inwardly toward the corners of the article 39.

When the article has delaminated areas at locations other than the corners, for example, at the sides, the gallery 83 is enlarged at the appropriate locations so as to apply the pressure against the delaminated areas.

It is not desirable to bring the internal face of the member 81 into direct contact with the article being heated because of possible damage thereto from the heat. To prevent such damage, and to reprint surface texture, a dish-shaped insert 97 formed from a heat-resistant elastomeric material such as silicone rubber having the desired surface texture is inserted into the space within the member 81 so as to snugly fit the inner sides thereof, so that when the pressure is applied within the gallery 83, the corners of the member 81 will press through the corners of the element 97 and cause the latter to exert pressure on the corners of the article 39.

Element 97 has a bottom surface 99 having a central aperture 101 therethrough and a plurality of shallow grooves 103 extending diagonally from the aperture toward the corners of the element. When the pneumatic pressure is introduced through the conduit 73 into the interior of the boot 47, the gas enters through the aperture 101 and is distributed along the grooves 103 so as to press against the top of the article 39 and force it out of the boot.

Figure 9:
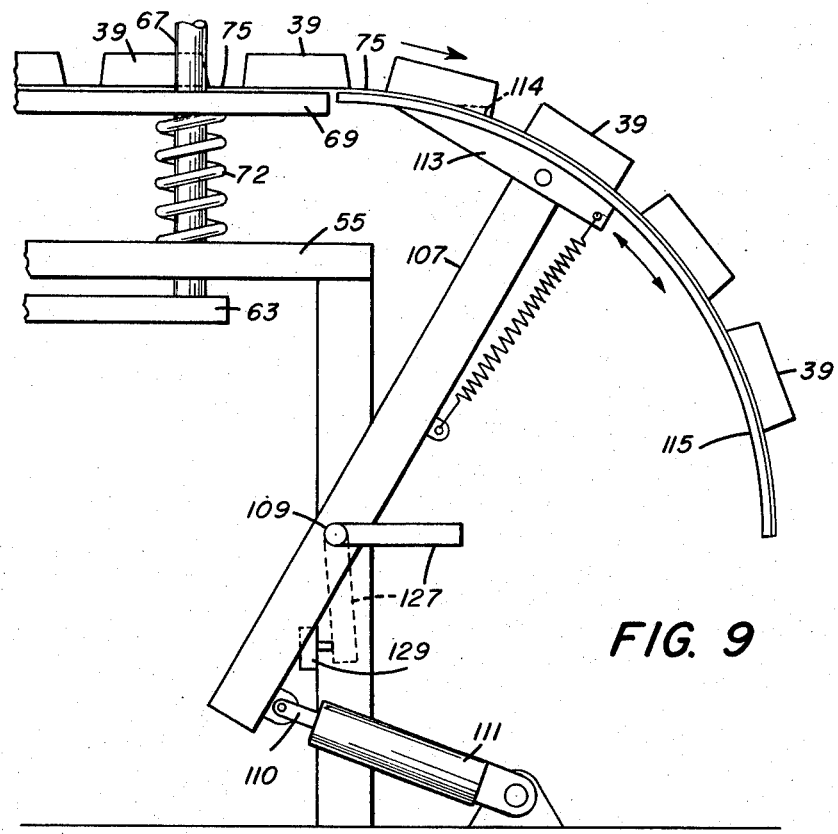
FIG. 9 is a schematic side elevational view showing a series of interconnected deep-drawn articles and the mechanism that advances them through the relamination station.

FIG. 9 shows a series of articles 39 connected together by a web 75 in such a way that they can be passed transversely through the heat-treating apparatus on their way from the drawing station to the finishing and trimming stations.

Intermittent movement of the articles one or more at a time is effected by a ratchet arm 107 pivoted to the machine frame at 109, actuated by a piston 110 and cylinder 111 at its lower end, and carrying a pivoted head 113 at its upper end having a latch 114 adapted to engage an article 39, and move it along a track 115, then to release the article and return to its original position. When one article at a time is being relaminated, ratchet arm 107 only moves the web the distance between two identical points on two articles; when two or more are treated at a time, the movement is the appropriate greater distance.

Figure 10:
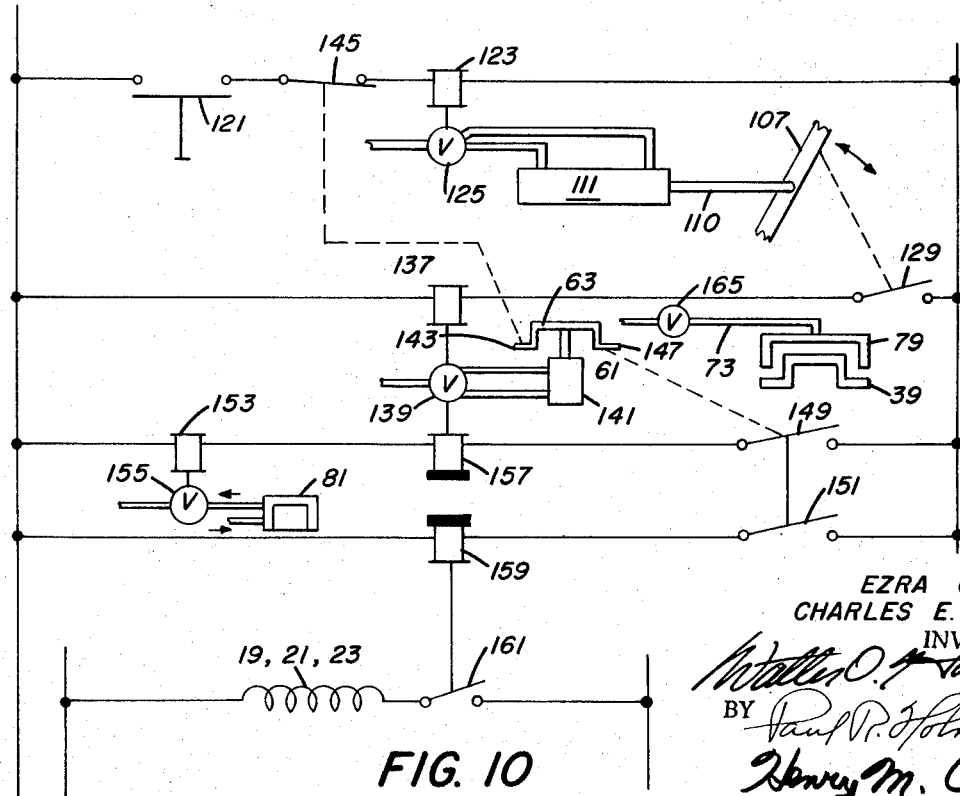
FIG. 10 is a schematic view showing an automatic control system for the apparatus.

A control system is shown in FIG. 10. To initiate the operation when the first article 39 in a web is in position for heat treatment, a normally open switch 121 is closed manually, energizing a relay 123 which actuates a valve 125 to feed air under pressure into cylinder 111 and move ratchet arm 107 (second mechanism) out of the position shown in FIG. 9 until a pawl 127 closes a switch 129 (first control means) just as arm 107 completes its stroke. The position of pawl 127 is adjustable on its pivot 109 for proper correlation of movement and control.

A relay 137 is energized through closed switch 129, actuating a valve 139 to feed air under pressure into a cylinder 141 and move piston 61 and crosshead 63 (first mechanism) downwardly to pull boot 47 down and position the article 39 over core 11, with the boot firmly pressing against the flange 41.

As crosshead 63 moves down, a finger 143 opens a switch 145, deenergizing relay 123 to reactivate valve 125 and cause pressure fluid to return ratchet arm 107 to its original position while reopening switch 129. A second finger 147 closes interlocked switches 149 and 151 (second and third control means).

Closed switch 149 energizes a relay 153 which partially closes a valve 155 and reduces the flow of liquid out of bladder 81, causing pressure to build up and force the bladder against element 97 which presses against the article 39. Simultaneously, a time delay relay 157 is energized.

Closed switch 151 energizes a time delay relay 159 which instantly closes switch 161 and starts the flow of high frequency induction heating current through coils 19, 21 and 23 to heat the metal of the article 39 from the inside while bladder 81 applies pressure against the plastic skin from the outside. After a predetermined time, relay 159 reopens switch 161.

A short time later, sufficient to reset the plastic bond, relay 157 (fourth control means) actuates valve 139 to feed air pressure into cylinder 141 and raise piston 61 to its previous position. Just as crosshead 63 begins its upward stroke, finger 147 reopens switches 149 and 151, causing relay 153 to reduce the fluid pressure in bladder 81. At the same time finger 147 mechanically opens a valve 165 (fifth control means) in air line 73 to force the article 39 out of element 97.

At the top of its stroke finger 143 again closes switch 145 (sixth control means) to actuate ratchet arm 107 and initiate a new cycle on the next article 39 in line. The first few articles in the web are manually positioned and moved through the relamination station until the first is in position to be gripped by head 113. Thereafter advance of the web is automatic.

The method and apparatus described in detail above effectively rebond the plastic skin to the metal of a deep drawn article such as a box-shaped camera back by reactivating the adhesive. Moreover, we have found that they effectively eliminate the problem of "plastic memory," which is the tendency of a plastic material to return to a previously stable shape, whereas heat treatment alone does not suffice. In the case of an article formed from a flat sheet of plastic coated metal, there is a tendency to return to the flat configuration. "Plastic memory" is particularly severe when deep drawing laminated sheets, but other factors which may alter "plastic memory" are temperature changes, abrasion, perforation, simple lapse of time, or any combination of these factors.

Another important advantage of our invention is that it restores the external surface appearance of plastic skin which has been altered during the forming operation. This is accomplished by using a pressure applying element 97 having the desired surface configuration which restores the surface character of the plastic skin to essentially its original appearance. Circulation of cooling liquid (the pressure inducing medium) assists restoration.

The principles of the invention apply to articles fabricated from any formable metal such as steel, brass, copper, aluminum and the like. Also, the plastic skin can be of any suitable material such as polyvinyl chloride, a copolymer of vinyl chloride and vinyl acetate, polyethylene, rubber, polystyrene, vinyl chloride-vinylidene chloride copolymers, and the like. The skin can be self-bonded when the polymer becomes sufficiently tacky when heated, but usually the bond is by means of a suitable adhesive as described in Patent 3,028,667.

The invention has been described in detail with particular reference to preferred embodiments thereof, but it will be understood that variations and modifications can be effected within the spirit and scope of the invention as described hereinabove and as defined in the appended claim.

We claim:
1. Apparatus for resetting, at a corner of a deep-drawn laminate article, the bond between the outer flexible thermoplastic sheet and inner metal sheet of such laminate article, said apparatus comprising:
    (a) a core configured to receive such deep-drawn article and including means, positioned and configured in correspondence with the inner surface of the corner of such article, for applying heat to such surface;
    (b) a concave boot configured to fit over such deep-drawn article and including an inflatable bladder portion of resilient material positioned in correspondence with the outer surface of the corner of such article;
    (c) means for inflating said bladder portion to apply pressure to the outer surface of such a deep-drawn article; and
    (d) means for mounting said core and boot for movement between an interfitting position with such a deep-drawn article therebetween and a spaced position for receiving such a deep-drawn article.

References Cited
UNITED STATES PATENTS 3,028,667 4/1962 Wintermute ---------- 29—529
3,360,417 12/1967 Peterson ------------ 156—380

ROBERT F. BURNETT, Primary Examiner

M. E. McCAMISH, Assistant Examiner

U.S. Cl. X.R.

29—472.9; 100—93 P; 156—94, 242, 285, 358, 359, 500; 264—36, 248